June 18, 1963     W. POTRAFKE     3,094,191
CASHIER'S TABLE FOR SELF-SERVICE STORES Filed Feb. 12, 1962     4 Sheets-Sheet 1

June 18, 1963

W. POTRAFKE 3,094,191

CASHIER'S TABLE FOR SELF-SERVICE STORES

Filed Feb. 12, 1962

June 18, 1963 W. POTRAFKE 3,094,191
CASHIER'S TABLE FOR SELF-SERVICE STORES
Filed Feb. 12, 1962 4 Sheets-Sheet 4

United States Patent Office 3,094,191
Patented June 18, 1963

3,094,191
CASHIER'S TABLE FOR SELF-SERVICE STORES
Werner Potrafke, Hufeisenstr. 6,
Hattingen (Ruhr), Germany
Filed Feb. 12, 1962, Ser. No. 172,638
Claims priority, application Germany Feb. 14, 1961
13 Claims. (Cl. 186—1)

The present invention relates to a cashier's table for self-service stores. In self-service stores, the buyer usually removes the goods picked out by him, in a carriage, wire basket or the like to the cashier's table where the cashier registers the price of the individual goods, totals the amount, receives the money and returns the change. In order to be able immediately after registering and totalling the prices for the bought goods to take care of the next customer, it is necessary that the paid-for goods of the first customer will immediately be conveyed to a space where the customer can pack them at his convenience while not barring the place in front of the cashier for the next customer so that the purchase price for the goods of the customer may be registered by the cashier. If such cashier table is properly designed, the cashier can work at a fast pace. However, many customers are rather awkward and slow in handling the goods and packing the same as well as in paying and checking the change.

In connection with cashier's tables for self-service stores, it is known to equip the cashier's table with a plurality of delivery compartments and to allot each customer when passing the cashier, a separate delivery compartment from which the customer may withdraw the goods and pack the same at his convenience. These delivery compartments are so arranged that when withdrawing the goods from the compartment, the customer has left the place where he placed the goods first in order to allow the cashier to check the goods and register the price thereof.

It is an object of the present invention to provide an improved cashier's table for self-serving stores which will make it possible to speed up the cashier's work and permit the customer quickly to move from the cashier to a place where the goods are collected and packed.

It is another object of this invention to provide a cashier's table as set forth in the preceding paragraph which will be rather simple in construction.

These and other objects and advantages of the invention will appear more clearly from the following specification in connection with the accompanying drawings, in which.

General Arrangement

Figure 1:
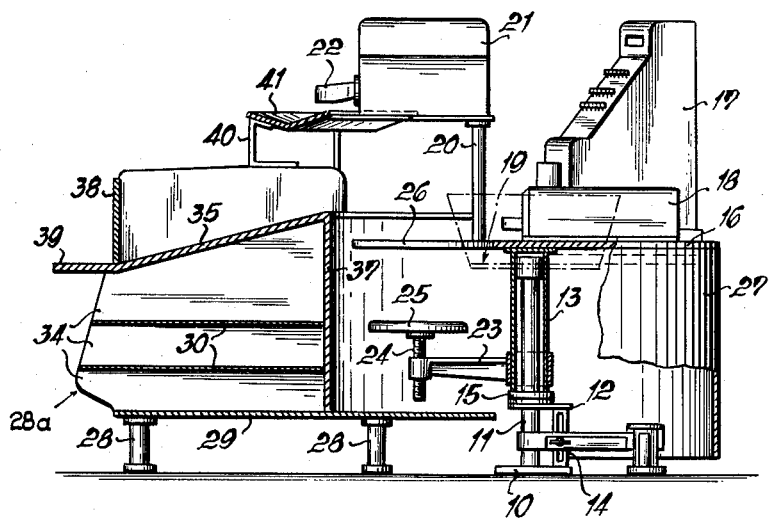
FIG. 1 illustrates a side view, partially in section of a cashier's table according to the invention, in which the table plate is supported by a vertical support.

The present invention concerns a cashier's table for self-serving stores which is equipped with a plurality of delivery compartments arranged adjacent to each other, into which compartments the cashier registering the purchase price of the goods will place the registered goods. The cashier's table according to the invention is characterized primarily in that the rotatable table carrying the cash register and a support for the goods selected by the customer for purchase, is equipped with a seat in such a way that the said support and cash register can easily be operated from said seat and is further characterized in that to each delivery compartment pertains a certain position of the table in which at the same time also the respective delivery compartment can easily be serviced from said seat. With a cashier's table of this type, the cashier can move around the axis of the rotatable table and can thereby always move to a place from which the cashier can easily service the respective delivery or withdrawal compartment. The other devices to be operated by the cashier are arranged on said table so that when the table rotates together with the seat connected thereto, the relative position of the cashier to the respective devices will remain unchanged.

The said devices which comprise the cash register and the place where the goods are deposited may also include other devices such as a change return, a discount stamp ejector and the like. While the term "rotatable table" has been used in the preceding paragraphs and will be used in the remainder of the specification, it is to be understood that the term "table" is to be understood in its broadest meaning. For placing the various devices required by the cashier, it is not necessary to employ a round plate, but supporting arms or the like connected to the rotatable portion of the table may well serve the same purpose. It is merely essential that when the table rotates, the relative position of the various devices with regard to the seat of the cashier will remain unchanged.

The seat of the cashier is, preferably by means of a substantially horizontal arm, connected to the shaft of the rotatable table. If an ordinary table plate is employed, the seat will be located below a cutout opening toward the outside.

When the delivery compartments are designed as groups of rectangles, squares or the like having their longer sides parallel or nearly parallel to each other, the axis of the rotable table is preferably located in the elongation of the central axis of the groups of delivery compartments. The inner confining wall of the cupboard-like frame on which the delivery compartments are mounted form a part of a circle around the axis of the rotatable table. When rotating the table, the cashier passes by said inner walls and can move into such a position from which she can best reach the respective delivery compartment corresponding to the customer being served. The outer confining walls of the delivery compartments may likewise describe a coherent circular surface. The center of this circle may be located either on the axis of the rotatable table or even better in many instances may represent a point located on the central axis of the compartments further towards the said compartments and may preferably be located outside the seat of the cashier.

Above the delivery compartments there is provided a strip which may be termed "the payment strip" and which serves for receiving the money from the buyer and also the change returned by the cashier. This payment strip describes a portion of a circle about the axis of the rotatable table. The said strip is over its entire length easily accessible to the cashier at different positions of the rotatable table. If the devices mounted on the rotatable table also comprise a change-return apparatus, the latter will, during the rotation of the rotatable table, describe a circle about the axis of said table. The payment strip and the change returning device are so arranged that the spout of the change-returning device will, during the rotation of the table, move above the payment strip.

The said spout is provided with a bore which is so arranged that the change fed into said spout will drop through said bore or opening and onto that portion of the payment strip at which the change-returning device will be located at said time. This position naturally depends on the respective position of the rotatable table. The change-returning device will be so arranged with regard to the axis of the rotatable table that the money will drop on that portion of the payment strip which is located directly above the compartment allotted to the respective customer. This position will be obtained by the fact that the cashier, in order to facilitate her work, will move the table during its rotation into such a position that she can particularly easily reach the respective delivery or withdrawal compartment.

The rotatable table may be adjustable as to height. If the rotatable table is formed by a plate carried by an axial support, a pipe may be provided at the bottom side of the plate which pipe may be moved axially along said support. The pipe may rest upon a ring which is adjustable as to height on said support. The face of the rotatable table may be equipped with a rotating drive operable from the seat of the cashier and adapted selectively to be made effective and ineffective. The torque of the table is in many instances rather low. When providing a fixed path of movement below the seat of the cashier, the latter will be able with her feet to impart upon the table the necessary rotary movement.

The seat is adjustable as to height in conformity with the height of the operator. To this end, the seat may by means of a spindle similar to a piano stool be guided in a supporting arm, or the supporting arm may be adjustable as to height on the shaft of the rotatable table. The supporting arm may also be adjustable as to length. The supporting arm may be so designed that by means of the latter the seat may be folded up or down. In such an instance, the space provided for the seat will be free and the operator may if so desired carry out her work while standing up.

Principally, the arrangement of a seat at the rotatable table is not necessary. Instead, a certain portion of the rotatable table may be recessed from which recess a person in standing position can easily operate the devices on the rotatable table. The servicing stand may be provided with a back for supporting the cashier's back and may furthermore be provided with a handle for rotating the table.

Instead of being carried by an axial support, the rotating table may according to a further embodiment of the invention, be movable by means of wheels or rollers on a track which extends circularly about the axis of the table. All of the wheels may be movable on the same track and may describe a circle the diameter of which equals approximately that of the table. However, it is also possible to make the wheels movable partly on an outer track of the said diameter and partly on a track which describes a circle of a reduced diameter. The tracks do not have to be arranged at the floor but may be located at a certain height preferably closely below the table surface or closely below a horizontal plane in which the cashier has to carry out her manipulations.

In the last mentioned instance, the space below the table will be free and may serve for storing wrapping material or other devices or for receiving the transporting baskets.

The space between table plate and tracks is, at least on that side which is remote from the delivery compartments, provided with a cover. The same applies to the lower space provided that no special cupboard or shelves are arranged in the latter. The seat for the cashier is preferably rotatably mounted on the table frame so that the operator can not only describe the path determined by the rotation of the table but can move in any position of the table to different sides.

In order to be able to vary the absolute height of the table plate and the relative height of the table plate with regard to the cashier, the table plate or the table frame may be adjustable as to height over the track.

According to a further embodiment of the invention, the rotatable table is designed as drum with substantially vertical walls. The drum has an upper bottom on which are mounted the various devices to be operated and on which the business between the cashier and the customer takes place. The drum has furthermore a lower bottom preferably the moving mechanism for the rotative movement, which mechanism may also be coupled with a mechanical drive. The wall of the drum may have the shape of a circular cylinder but may also have the shape of the wall of a truncated cone while said truncated cone may taper either upwardly or downwardly. Such driving mechanism may comprise three rollers journalled in a supporting frame, on which moves the lower bottom of the drum. One of these rollers is provided with a drive.

The seat of the cashier may be mounted on the inside of a flap which closes an entry opening in the drum wall. The space where the seat or stand of the cashier is located is confined by a substantially vertical wall which extends from the wall of the drum in upward direction. The space between the drum wall and the confining wall of the stand or seat of the cashier may serve for instance for piling up empty baskets.

In order to facilitate the collecting and piling up of the empty baskets, there is in conformity with a further feature of the invention a further bottom provided which is slightly above the lower drum bottom and is rotatable relative thereto. This further bottom can be rotated by the cashier by a certain angle. The cashier may deposit the baskets in a plurality of piles on said last mentioned bottom. The drum wall is provided with an opening through which the space for piling up the baskets will be accessible. The said opening is adapted to be closed by a gate opening toward the outside. The bottom for piling up the baskets may also be provided with a rotative drive operable by the cashier.

Expediently, the upper drum bottom in addition to having a recess for the stand or seat of the cashier may also have an additional recess lowering the emptied baskets. This last mentioned recess is advantageously arranged at the left-hand side of the cashier's seat and is provided with an adjustable device in order to hold that basket which still contains goods in a sunken position. After the goods in the baskets have been registered, the empty basket may be lowered by adjusting the holding device.

The essence of the present invention consists in permitting the various operations of the cashier in such a way that these operations can be carried out in sitting or standing position and with the least possible fatigue. To this end, the various devices to be operated and the places where the purchased articles are picked up and are to be deposited have been brought in a favorable relationship to the cashier.

Figure 2:
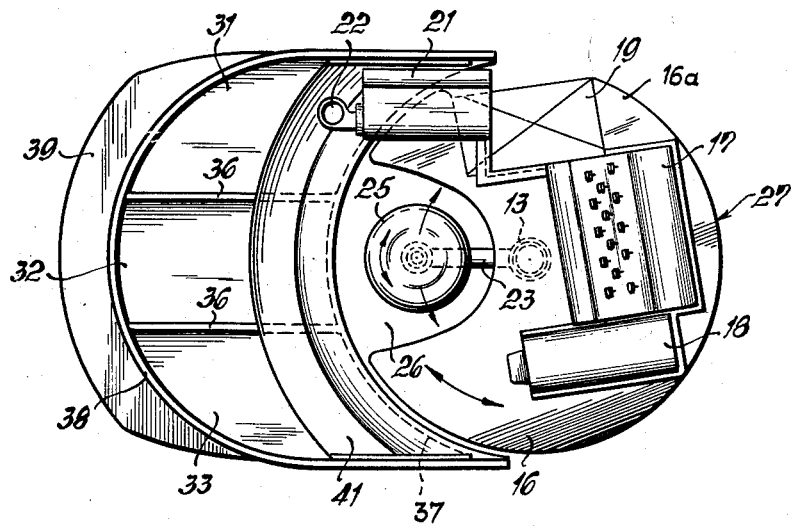
FIG. 2 is a top view of the arrangement shown in FIG. 1.

Referring now to the drawings in detail, and FIGS. 1 and 2 thereof in particular, the arrangement shown therein comprises a leg 11 with a base plate 10 while a holding ring 12 and a tubular shaft 13 for the table are supported by said leg 11. The arrangement furthermore comprises a supporting column 14 for holding ring 12 on which the shaft 13 is rotatably journalled by means of an anti-friction bearing 15. The supporting column 14 is adjustable as to height. The shaft 13 carries a table plate 16 which, in turn, carries a cash register 17 and a discount stamp ejector 18. Moreover, the table plate 16 comprises a portion 16a on which the basket 19 for the goods may be deposited. Also mounted on table 16 is a support 20 which carries a change-returning device 21 with a discharge spout 22. The arrangement according to the invention furthermore comprises a supporting arm 23 which is adjustable as to length and height and has journalled therein a seat 25 which is adjustable as to height by means of a spindle 24. The table plate 16 has a cutout 26 around the seat 25, as shown in FIG. 2. On that side of the rotatable table 16 which is remote from withdrawal or delivery compartments 31, 32 and 33, there is provided a circumferential cover 27. The delivery compartments 31, 32 and 33 for receiving the goods after they have been registered by the cashier, are supported by a frame 28a which is carried by column 28 and base plate 29. Said base plate 29 partially forms the floor of a room through which the cashier seat 25 will pass. The said floor may serve for resting the feet and also for supporting the same when the cashier rotates the table 16. Above plate 29 there are provided two further plates 30 which together with plate 29 form three superimposed compartments 34 open toward the outside in which wrapping material as, for instance bags, may be stored. The three withdrawal compartments 31, 32 and 33 are confined by bottoms 35 which are inclined toward the outside, i.e., to the withdrawal side, and are further confined by parallel longitudinal walls 36 and the continuous outer wall 38. A wall 37 forms the inner confining wall for the compartments 34. Wall 37 extends parallel to the edge of the table 16, i.e., forms a portion of a cylinder wall the axis of which coincides with the axis of rotation of the rotatable table 16. The withdrawal compartments 31, 32 and 33 are open toward the rotatable table 16 in order to permit the cashier to deposit therein the registered goods. In front of the outer wall 38 of the said compartments 31, 32 and 33 there is provided a plate 39 which extends perpendicular to wall 38 and serves as support for the pocketbook of the customer or other articles carried by the latter.

Mounted on walls 36 separating the compartments 31, 32 and 33 are supports 40 carrying a payment strip 41 which, similar to wall 37, extends along a circle with the center thereof located on the axis of the rotatable table 16.

The operation of the cashier table shown in FIGS. 1 and 2 is effected in the following manner: First, the rotatable table is from the illustrated position turned to such an extent that the cutout 26 of the table plate 16 will be located outside the range of wall 37 so that the cashier can sit down on seat 25. From this seat, approximately in the illustrated position of table 16, the cashier will start serving the customer whose basket 19 rests on table portion 16a, and will allot the customer one of the three discharging compartments 31, 32 or 33. As soon as the customer has placed her basket 19 on the corresponding plate 16a, the customer is requested to move to the discharge compartment allotted to her. While the customer is doing so, the cashier registers one article after the other in cash register 17 and deposits the registered goods into one of the respective allotted compartments 31, 32 and 33. While doing so, the operator has moved into a position where she can best reach the respective discharge compartment. When all goods have been registered and the cashier has advised the customer as to the total of her bill, the customer places the money on the payment strip 41, cashier removes the money from said strip 41, and, as the case may be, places the change on the payment strip 41, for instance, by means of the change-returning device 21. The cashier now turns to the next customer while the previous customer can take her time to receive the change, to check it, and to remove the purchased goods from the respective discharge compartment and place the same in a bag which the customer takes from one of the shelves 30.

When the goods to be registered by the cashier are placed on the cashier table not in a portable container or basket but when the customer moves the goods on a carriage to the cashier table, it is advantageous to design a portion of the table in front of the cashier as a foldable portion so that the cashier, by folding the said portion downwardly, can move into the thus created opening and pull the carriage toward her so that the cashier will be able to register the individual goods. After the carriage has been emptied, she pulls the carriage toward her while moving the table until the table cutout, where the seat or stand is located, is open toward the outside. The carriage will then be moved outwardly, and the cashier returns to her regular position while moving the table into a position from which the cashier can serve the next customer. If the latter has a portable container in which the customer has collected the goods, the folded-down table portion is then folded up again.

Figure 3:
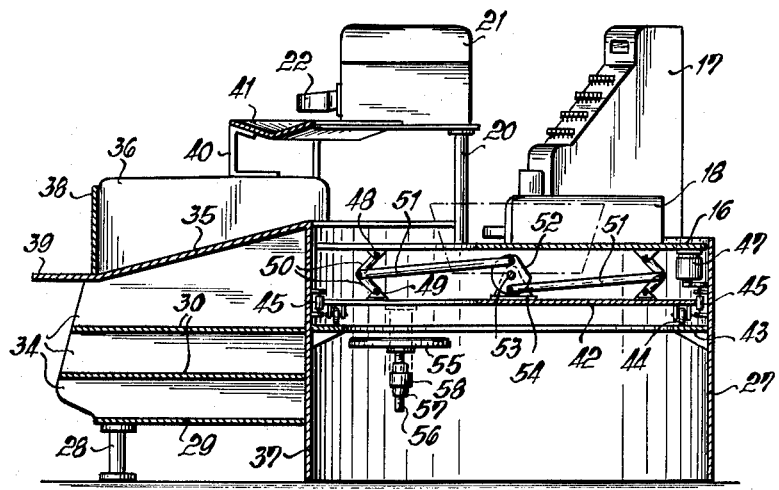
FIG. 3 represents a side view, partially in section, of a modified cashier's table according to the invention, in which the table system is movable along a circular path.
Figure 4:
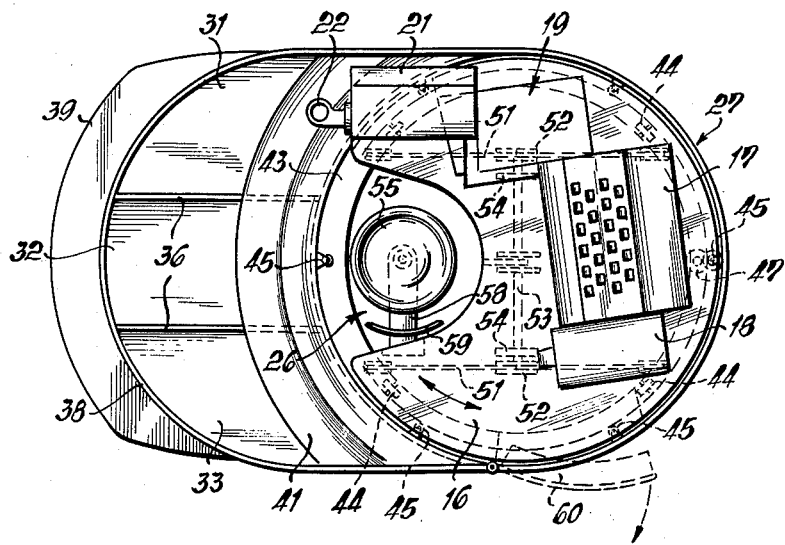
FIG. 4 is a top view of the table according to FIG. 3.
Figure 5:
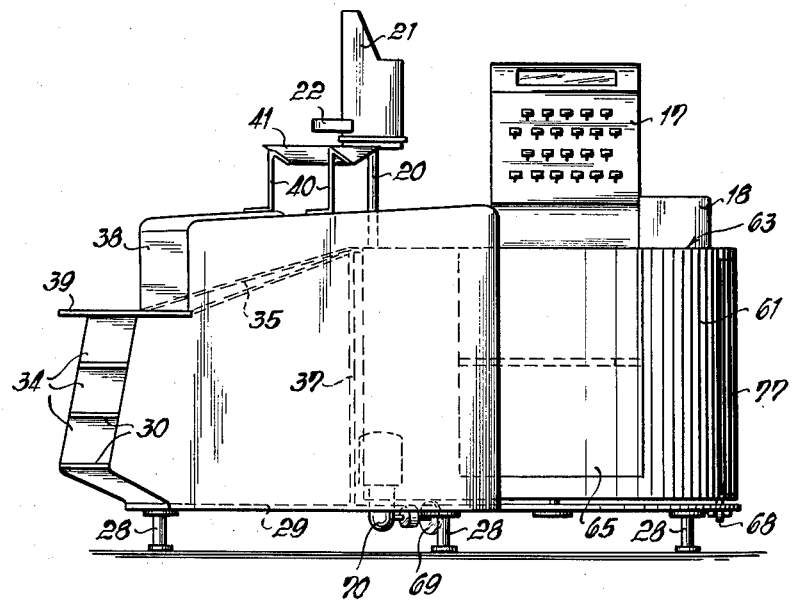
FIG. 5 represents a side view of a third embodiment of a cashier's table according to the invention, in which the rotatable table is designed in form of a drum.
Figure 6:
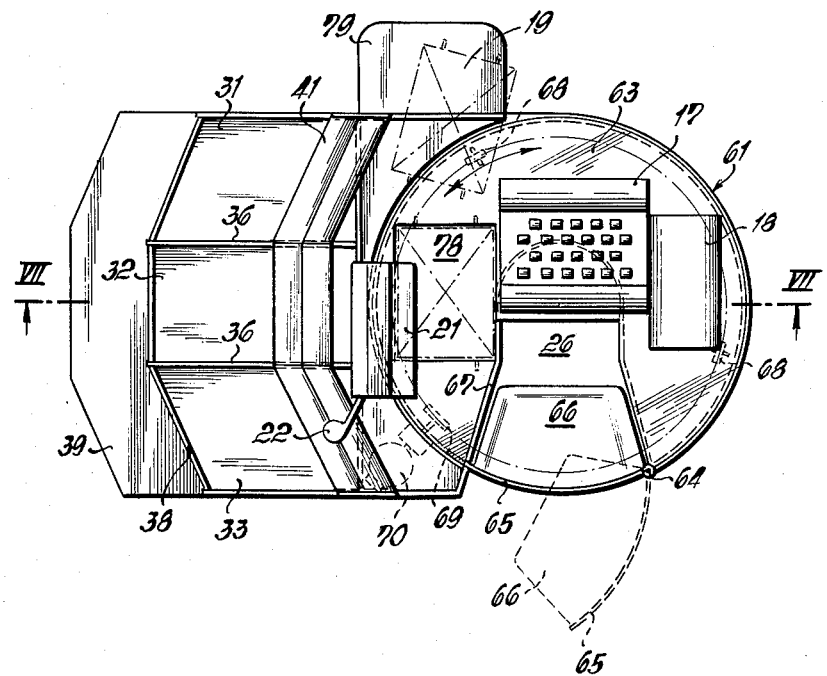
FIG. 6 is a top view of the cashier's table according to FIG. 5.
Figure 7:
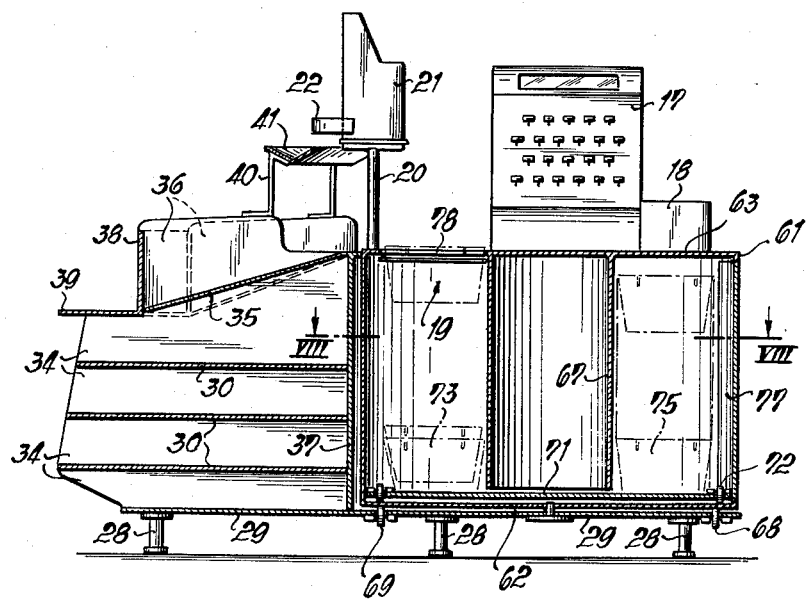
FIG. 7 is a vertical section taken along the line VII—VII of FIG. 6.

Also with the arrangement shown in FIGS. 3 and 4, the rotatable table 16 supports a portion of the devices employed by the cashier, viz. the cash register 17 and the discount stamp ejector 18. The table comprises portions for the depositing of the basket 19. The arrangement furthermore comprises a column 20 for supporting the change-return device 21 with the spout 22. As will be evident from FIG. 4, the table plate 16 has a cutout 26 in which is arranged either a seat or which may confine an open space. The arrangement also comprises a circumferential cover 27. Fixedly arranged with regard to table plate 16 and separated by a partition from the range of rotation of table 16 is the framework for the delivery compartments 31, 32 and 33. This framework is provided with compartments 34, and a payment strip 41 rests on supports 40 similar to the arrangement of FIGS. 1 and 2.

The table plate 16 is by means of the rotatable table 42 journalled on the holding ring 43 so as to be adapted to be raised or lowered. Holding ring 43 is connected to partition 37 and cover 27. The rotatable table 42 is, by means of wheels 44, displaceably mounted on holding ring 43. The outer edge portion of table 42 is guided by friction rollers 45 which are arranged on cover 27 or partition 37. One of the rollers 45 may be equipped with an electric drive motor 47 by means of which the table plate may be rotated.

The mounting of table plate 16, which is adapted to be raised and lowered, is so designed that pivots 48 are arranged at the bottom side of table plate 16, whereas pivots 49 are provided on the top side of rotatable table 42. Pivotally connected to the pivots 48 and 49 are pairs of levers 50. Pivoted to each pair of levers 50 are bars 51 having their other ends pivotally journalled in discs 52. The center points of the two discs 52 are rigidly connected to a bar 53 which, in the neighborhood of its ends, is guided in bearings 54, and in which, preferably in the central portion, there is arranged an adjusting and arresting device. Said adjusting and arresting device is so arranged that it can easily be reached by the cashier. Similarly, a push-button for switching on the electric motor 47 is easily reachable by the cashier, said push-button being adapted to bring about the rotation of the table plate.

The seat 55 of the cashier is, by means of a spindle 56 guided in a sleeve 57 which is arranged on a supporting arm 58. A back 59 is provided for resting the back of the cashier. Reference numeral 60 designates a door provided in the cover 27 through which door the cashier may reach her seat or position when cutout 26 is moved to this position.

The space below the rotatable table 42 may be employed in various manners. In particular, it may serve to receive devices for collecting and piling up of the baskets employed by the customers.

In the arrangement of FIGS. 5 to 8, the rotatable table is formed by a drum comprising the lower drum bottom 62, the upper drum bottom 63, and the cylindrical wall 61. The cash register 17 and the discount stamp ejector 18 are mounted on the upper drum bottom. Mounted on a column 20 is the change-returning device with ejector spout 22. A cutout 26 of the upper bottom 62 designates the location of the cashier.

The lower drum bottom 62 moves on two rollers 68 and on roller 69 equipped with a motor drive 70. The rollers 68 and 69 are journalled in base plate 29 which rests on columns 28. Laterally of the rotatable table there are provided the delivery compartments 31, 32 and 33 in a stationary framework which is designed in conformity with the other embodiments described above. The arrangement of FIGS. 5 to 8 also comprises a payment strip 41.

A gate 65 adapted to be folded about the vertical axis 64 carries the seat 66 of the cashier. The stand of the cashier is by means of a wall 67 rigidly connected to the drum wall 61, separated from the further outwardly located part of the interior of the drum.

A bottom 71 for supporting the baskets is by means of rollers 72 rotatably journalled on the lower drum bottom 62. The space between the confining wall 67 and drum wall 61 is accessible through an opening 76, which is adapted to be closed by means of an outwardly opening gate 77.

Figure 8:
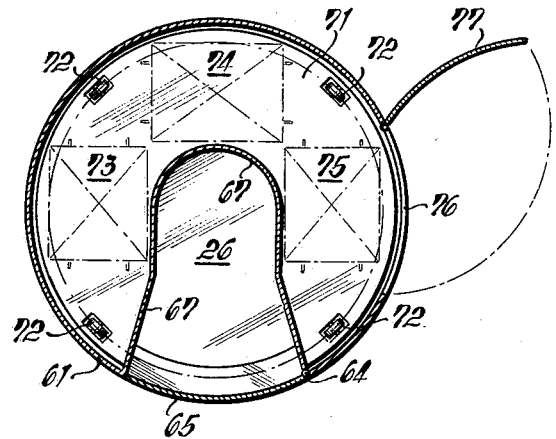
FIG. 8 is a horizontal section through the drum forming the rotatable table, said section being taken along the line VIII—VIII of FIG. 7.

The upper drum bottom 63 has a recess 78 in which holding means are provided to insert a basket in somewhat sunken-in position. Through this recess, the emptied basket may also be lowered. The baskets may be collected in piles on bottom 71, as illustrated in FIG. 8 by the piles 73, 74 and 75. The framework comprising the discharge compartments is equipped with an outwardly protruding depositing plate 79.

The working with the cashier table of FIGS. 5 to 8 may be effected in the following manner. The cashier, by opening gate 65, first moves to her servicing position and after closing gate 65, sits down on seat 66. From here she serves the customer, who has deposited her basket 19 on the depositing plate 79. The cashier pulls the basket onto the upper drum bottom 63 and within recess 78 moves said basket in a sunken position. She then allots the customer one of the delivery compartments 31, 32 or 33 and moves the rotatable table in such a position that she can conveniently deposit the registered goods in the respective compartment. Each individual piece will now be registered. After registration of goods and after depositing said goods in the respective discharging compartment, the cashier names the total amount registered by the cash register 17 and accepts the payment which the customer places on payment strip 41, and, more specifically, on that portion thereof which is above the respective discharge compartment. When the drum occupies a corresponding position, also the change dispensing device 21 with its spout 22, will be at said place. The customer now receives her change in bills or coins, and has been completely served. The customer now has sufficient time to remove her goods from the delivery compartment and to wrap said goods. In the meantime, the next customer has deposited her basket 19 on the plate 79.

By turning the drum, the cashier has moved into a position which corresponds to another delivery compartment and again starts to register the goods.

The emptied baskets are lowered by the cashier below the recess 78 and there form the pile 73. When this pile has reached a certain height, the cashier moves the depositing bottom 71 further by about 90° so that the first pile will be at that position where, in FIG. 4, pile 74 is located. From time to time, the empty baskets are collected by opening gate 77 and by removing all baskets through opening 76 of the depositing bottom.

The drum-like arrangement of the rotatable table procures a place for the cashier from which she can work in an undisturbed manner with the line of customers. The interior of the drum may be provided with heating means. Also, the cashier is protected against cold air flow. The space below the drum may be employed for piling up a great number of baskets so that no special space has to be provided therefor. Cashier's tables of this type may be mounted adjacent each other in any desired quantity. It is merely necessary to leave free therebetween a chamber which will be sufficient for the passage of the persons coming with a basket.

It is, of course, to be understood that the present invention is, by no means, limited to the particular constructions shown in the drawings, but also comprises any modifications within the scope of the appended claims.

What I claim is:

1. A cashier's station for self-service stores, which comprises in combination: a rotatable table, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being arranged adjacent to each other and being accessible from the outside to permit a customer to withdraw his purchased goods therefrom, and a seat rotatably connected to said table and arranged so that said cash register and said deposit section are within reach of a person on said seat, said seat being rotatable selectively into a plurality of positions which respectively correspond to said withdrawal compartments and in which the respective withdrawal compartment is within reach of a person on said seat, whereby a person on said seat can in the respective position of said table reach both the deposit section and the respective withdrawal compartment.

2. A cashier's station for self-service stores, which comprises in combination: a rotatable table, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being arranged adjacent to each other and being accessible from the outside to permit a customer to withdraw his purchased goods therefrom, a seat, and an arm rotatably connected to said table and supporting said seat whereby said seat and said table are rotatable together, said table having a cutout portion and said seat being arranged at a level lower than said cutout portion and relative thereto so that the vertical upward projection of said seat would pass through said cutout portion, said seat being arranged so that said cash register and said deposit section are within reach of a person on said seat, said seat being movable selectively into a plurality of positions which respectively correspond to said withdrawal compartments and in which the respective withdrawal compartment is within reach of a person on said seat, whereby a person on said seat can in the respective position of said table reach both the deposit section and the respective withdrawal compartment.

3. A cashier's station for self-service stores, which comprises in combination: a rotatable table, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being arranged adjacent to each other and being accessible from the outside to permit a customer to withdraw his purchased goods therefrom, a seat rotatably connected to said table and arranged so that said cash register and said deposit section are within reach of a person on said seat, said seat being rotatable selectively into a plurality of positions which respectively correspond to said withdrawal compartments and in which the respective withdrawal compartment is within reach of a person on said seat, whereby a person on said seat can in the respective position of said table reach both the deposit section and the respective withdrawal compartment, and a payment strip extending substantially along a portion of a circle around the axis of said rotatable table and within the reach of a person on said seat for receiving the purchase price from the customer and returning any change due to the customer.

4. A cashier's station according to claim 3, which includes a change-returning device mounted on said rotatable table and provided with a discharge spout arranged above said payment strip and movable thereabove in response to a turning movement of said rotatable table.

5. A cashier's station according to claim 1, which includes an outer covering wall arranged at that side of said table which is remote from said seat, said covering wall extending from said table downwardly near the floor.

6. A cashier's station according to claim 1, in which said seat is designed as a foldable seat.

7. A cashier's station for self-service stores, which comprises in combination: table means, a cash register carried by said table means, said table means including a deposit section for receiving the goods which have been selected and are to be deposited by a customer onto said deposit section, frame means for supporting said table means, said frame means including circular track means, a plurality of wheels connected to said table means and supported by said track means to thereby permit rotation of said table means about the axis of said track means, a plurality of withdrawal compartments for receiving the purchased goods after they have been registered by said cash register, said withdrawal compartments being arranged adjacent to each other and being accessible from the outside to permit a customer to withdraw his purchased goods therefrom, and a seat rotatably connected to said table means and arranged so that said cash register and said deposit section are within reach of a person on said seat, said seat being rotatable selectively into a plurality of positions which respectively correspond to said withdrawal compartments and in which the respective withdrawal compartment is within reach of a person on said seat, whereby a person on said seat can in the respective position of said table reach both the deposit section and the respective withdrawal compartment.

8. A cashier's station for self-service stores, which comprises in combination: a drum having a substantially vertical cylindrical wall and having its upper end face designed as a rotatable table, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being accessible from the outside to permit a customer to withdraw his purchased goods therefrom, and a servicing stand so arranged that said cash register and said withdrawal compartments and said deposit section are within reach of a person on said servicing stand.

9. A cashier's station according to claim 8, which includes supporting means comprising a plurality of rollers supporting the lower end face of said drum for permitting rotation of the same.

10. A cashier's station for self-service stores, which comprises in combination: a rotatable table formed by the upper end face of a drum having a substantially vertical cylindrical wall, said table having a cutout confining a cashier's stand, a portion of said cylindrical wall being designed as a door for permitting a cashier to enter said stand from the outside, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being accessible from the outside to permit a customer to withdraw his purchased goods therefrom, said cutout for said cashier's stand being so arranged that said deposit section, said cash register and said withdrawal compartments are within reach of a person on said cashier's stand.

11. A cashier's station for self-service stores, which comprises in combination: a rotatable table formed by the upper end face of a drum having a substantially vertical cylindrical wall, said table having a cutout confining a cashier's stand, substantially vertical wall means adjacent said cutout and extending therefrom to said cylindrical wall for confining the space for said cashier's stand, a portion of said cylindrical wall being designed as a door for permitting a cashier to enter said stand from the outside of said drum, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being accessible from the outside to permit a customer to withdraw his purchased goods therefrom, said cutout for said cashier's stand being so arranged that said deposit section, said cash register and said withdrawal compartments are within the reach of a person on said cashier's stand.

12. A cashier's station according to claim 11, in which said cylindrical drum wall and said vertical wall means confine with each other a storage space for storing empty baskets employed by the customer for bringing his goods to the cashier's station.

13. A cashier's station for self-service stores, which comprises in combination: a rotatable table formed by the upper end face of a drum having a substantially vertical cylindrical wall, said table having a cutout confining a cashier's stand, substantially vertical wall means adjacent said cutout and extending therefrom to said cylindrical wall for confining the space for said cashier's stand, said vertical wall means together with said cylindrical drum wall confining a storage chamber for empty baskets employed by the customer for bringing his goods to said cashier's station, first bottom means formed by the lower end face of said drum, second bottom means arranged within said drum slightly above said first bottom means, said second bottom means being rotatable relative to said first bottom means for receiving and supporting the empty baskets to be stored in said storage chamber, gate means provided in said cylindrical drum wall at the level of said second bottom means and adapted selectively to be opened for withdrawal of the baskets stored in said storage chamber, a portion of said cylindrical wall being designed as a door for permitting a cashier to enter said stand from the outside of said drum, a cash register carried by said table, said table including a deposit section for receiving the goods which have been selected and are to be deposited by a customer onto said deposit section, a plurality of withdrawal compartments for receiving the purchased goods after they have been registered by said cash register, said withdrawal compartments being accessible from the outside to permit a customer to withdraw his purchased goods therefrom, said cutout for said cashier's stand being so arranged that said deposit section, said cash register and said withdrawal compartments are within the reach of a person on said cashier's stand.

References Cited in the file of this patent

UNITED STATES PATENTS

| 1,046,853 | Proal | Dec. 10, 1912 |
| 1,592,931 | Fritsche | July 20, 1926 |
| 2,599,909 | George | June 10, 1952 |

FOREIGN PATENTS

| 796,024 | Great Britain | June 4, 1958 |